United States Patent [19]

Schneider et al.

[11] 4,160,749
[45] Jul. 10, 1979

[54] PROCESS FOR DISSOCIATING POLYURETHANE RESINS

[75] Inventors: Gottfried Schneider; Kuno Wagner, both of Leverkusen; Werner Dietrich, Cologne, all of Fed. Rep. of Germany

[73] Assignee: Bayer Aktiengesellschaft, Leverkusen, Fed. Rep. of Germany

[21] Appl. No.: 880,536

[22] Filed: Feb. 23, 1978

[30] Foreign Application Priority Data

Mar. 15, 1977 [DE] Fed. Rep. of Germany ....... 2711145

[51] Int. Cl.² ............................................. B29H 19/00
[52] U.S. Cl. .................................. 260/2.3; 260/95 R; 260/95 C; 521/163; 528/73; 528/76; 528/85
[58] Field of Search ................... 260/2.3, 25 A, 25 BD

[56] References Cited

U.S. PATENT DOCUMENTS

| | | | |
|---|---|---|---|
| 2,937,151 | 5/1960 | Ten Broeck et al. | 260/2.3 |
| 3,117,940 | 1/1964 | McElroy | 260/2.3 |
| 3,758,444 | 9/1973 | Wagner et al. | 260/75 NH |
| 3,867,373 | 2/1975 | Wagner | 260/3 R |
| 4,013,625 | 3/1977 | Wagner et al. | 260/77.5 AA |
| 4,014,809 | 3/1977 | Kondo et al. | 260/2.3 X |
| 4,035,314 | 7/1977 | Lohr, Jr. et al. | 260/2.3 |

FOREIGN PATENT DOCUMENTS

| | | |
|---|---|---|
| 2129198 | 12/1972 | Fed. Rep. of Germany. |
| 2238109 | 2/1973 | Fed. Rep. of Germany. |
| 2362919 | 7/1974 | Fed. Rep. of Germany. |
| 2362920 | 7/1974 | Fed. Rep. of Germany. |
| 2362921 | 7/1974 | Fed. Rep. of Germany. |
| 2325090 | 11/1974 | Fed. Rep. of Germany. |
| 1391891 | 4/1975 | United Kingdom. |

*Primary Examiner*—Thomas DeBenedictis, Sr.
*Attorney, Agent, or Firm*—Gene Harsh; Joseph C. Gil; R. Brent Olson

[57] ABSTRACT

The instant invention is directed to a process for dissociating cellular and non-cellular polyurethane resins into re-usable starting products for the isocyanate polyaddition process, wherein the polyurethane is reacted with associates of lactams and adduct-formers having at least two Zerewitinoff-active hydrogen atoms at from 150° to 250° C., optionally at elevated pressure, the improvement wherein from 35 to 1000 parts, by weight, based on 100 parts, by weight, of the polyurethane, of an associate mixture of:

(a) from 4 to 50 parts, by weight, of a lactam or azalactam, based on 100 parts, by weight, of polyurethane; and a mixture of:

(b) water and/or a compound having a molecular weight of from 62 to 200 having at least two Zerewitinoff-active hydrogen atoms; and (c) a polyhydroxyl compound having a molecular weight of from 300 to 6000; is used, and the proportion by weight of components (b) to (c) is from 1:10 to 10:1, and wherein said component (a) is used in a quantity such that said 35 to 1000 parts comprises from 4 to 50 parts of component (a).

12 Claims, No Drawings

PROCESS FOR DISSOCIATING POLYURETHANE RESINS

BACKGROUND OF THE INVENTION

Hand-in-hand with the vigorous growth of the polyurethane production industry, there has been a concomitant increase in the problem of removing and re-using polyurethane waste or reject goods. Although a market has been found for flakes of flexible polyurethane foam by glueing the flakes together to form a composite material, only a limited quantity of flexible foam may be utilized in this way. There is no similar possibility of using waste from semi-rigid or rigid polyurethane foams or from elastomer granulates. Large quantities of polyurethane waste and reject goods from the production of rigid and flexible foams and the production of elastomers must therefore be stored in depots or destroyed in refuse incineration plants. This gives rise to considerable ecological, technical and economic problems because of the low specific gravity and hence large bulk of the waste and reject goods.

There is therefore considerable interest both on ecological and on economic grounds for industrially utilizing the ever-increasing quantities of polyurethane waste.

Processes have been disclosed for this purpose in German Offenlegungsschriften Nos. 2,362,919; 2,362,920 and 2,362,921, according to which polyurethane foam waste is hydrolyzed using steam at high temperatures. These processes require high temperatures and pressures (for example, 240° C. and 40 atmospheres) so that the dissociation of polyurethane waste may only be achieved at great cost and considerable outlay LeA 17,948 for equipment. Moreover, the reaction products are obtained as mixtures with water so that they must be isolated by specialized processes before they may be re-used.

German Offenlegungsschrift No. 2,238,109 describes how to degrade polyurethane foam waste into refoamable polyols by heating to a temperature of from 175 to 250° C. in high-boiling dihydroxy compounds, preferably diethylene glycol and preferably in the presence of approximately 10% of a diethanolamine. Under these conditions, a transurethanization process takes place by which the polyurethane is converted into short chain polyols which may only be used advantageously for the production of rigid polyurethane foams. According to German Offenlegungsschrift No. 2,238,109, this process is preferably only used for breaking down rigid polyurethane foams. The main disadvantage of this process is that decomposition proceeds so slowly that addition of the foam waste takes several hours and the reaction mixture must still be stirred for some time after all the foam has been added. The process therefore consumes a great deal of energy and is difficult to operate on a continuous basis.

According to an earlier proposal by the present applicants (U.S. application Ser. No. 723,872, filed Sept. 16, 1976), now U.S. Pat. No. 4,115,298 polyurethane waste is dissolved in lactam melts or in associates of lactams and adduct-formers having at least two Zerewitinoff-active hydrogen atoms at elevated temperatures. The types of polyurethane bonds which cause chain-lengthening and chain-branching are thereby opened. This process leads, within very short reaction times, to activated polyhydroxyl compounds which may be used again as starting components for the production of polyurethane resins, such as flexible or rigid polyurethane foams or polyurethane elastomers. If, however, such activated polyhydroxyl compounds are used as the only polyol component for the production of rigid polyurethane foams, only very brittle, crumbly foams of inferior quality are obtained, which, for many fields of application, do not meet the market requirements. To improve the properties of polyurethane resins produced from the activated polyhydroxyl compounds described above, it is therefore recommended to mix the resultant polyhydroxyl compounds with other low molecular weight or higher molecular weight polyhydroxyl compounds, such as polyethers and/or polyesters. However, since the activated polyhydroxyl compounds obtained according to U.S. Ser. No. 723,872 are highly viscous masses, particularly those which have been obtained from rigid polyurethane foams, such mixing is not without its technical difficulties. Many of the commercial polyhydroxyl compounds such as those conventionally used as starting components for the production of high quality rigid polyurethane foams are quite impossible to mix homogeneously with the activated polyhydroxyl compounds. Inhomogeneous polyol mixtures, however, are for the most part unusable for processing in present-day foaming machines and for obtaining high quality rigid polyurethane foams.

DESCRIPTION OF THE INVENTION

It has now surprisingly been found that polyurethane (both cellular and non-cellular) may be rapidly dissociated into activated polyhydroxyl compounds at elevated temperatures in mixtures of: (1) associates of lactams and water or other low molecular weight adduct-formers containing at least two Zerewitinoff-active hydrogen atoms the preparation of which has been described in British Pat. No. 1,391,891, U.S. Pat. Nos, 3,867,373 and 3,758,444, German Offenlegungsschrift No. 2,129,198; and (2) associates of lactams and one or more high molecular weight polyhydroxyl compounds, e.g. hydroxyl polyethers and/or hydroxyl polyesters. Not only all chain-branching, but also all chain-lengthening types of bonds (urethane and urea groups) are dissolved under these conditions, as is evident from the relatively high OH numbers, the low viscosities and the basic nitrogen content in the products of the process. Since isocyanurate and carbodiimide groups are split off at the same time, rigid polyurethane foams which contain these groups may also be readily converted into isocyanate-reactive compounds by this method. Organic-inorganic plastics, such as those described in German Offenlegungsschrift No. 2,325,090 may also be degraded by this method. With the exception of the dissociation reaction using adducts of lactams and water, in which elevated pressures are preferably employed, it is not necessary to carry out the dissociation reactions at elevated pressures.

It has also surprisingly been found that completely homogeneous polyol mixtures which are stable in storage may be obtained by this method. Such stable mixtures may even be obtained with polyols which are incompatible with the activated polyhydroxyl compounds prepared according to the U.S. application noted earlier as will be seen from the comparison Example below.

The products of the process are viscous liquids which may be reacted with diisocyanates and/or polyisocyanates without further addition of polyol to produce new flexible, semi-rigid and rigid foams which have excellent foaming properties and mechanical properties. They may also be used as polyol components for the production of flexible polyurethane elastomers.

The properties of the polyurethane resins obtained may be modified as desired by the choice of polyols used in the form of the lactam associate.

The present invention thus relates to a process for the degradation of cellular and non-cellular polyurethane waste or polyurethane reject goods into re-usable starting materials for the isocyanate polyaddition process, wherein the polyurethane is reacted at from 150° to 250° C., preferably from 165° to 220° C., optionally at elevated pressure, with associates of lactams and adduct-formers having at least two Zerewitinoff-active hydrogen atoms, characterized in that from 35 to 1000 parts, by weight, based on 100 parts, by weight, of polyurethane, of an associate mixture of:

(a) from 4 to 50 parts, by weight, of a lactam or azalactam, based on 100 parts, by weight, of polyurethane, and a mixture of:

(b) water and/or a compound containing at least two Zerewitinoff-active hydrogen atoms and having a molecular weight of from 62 to 200; and (c) a polyhydroxyl compound having a molecular weight of from 300 to 6000; are used, the ratio, by weight, of components (b) and (c) being from 1:10 to 10:1, preferably from 1:10 to 1:1, the quantity of components (a) in said 35 to 1000 parts by weight being from 4 to 50 p.b.w.

The addition compounds of lactams with adduct-formers having Zerewitinoff-active hydrogen atoms used in the process act on the urethane, urea, biuret and allophanate bonds both through the lactam component and through the hydroxyl-containing and/or amino-containing component which is in an activated form.

The degradation reactions presumably take place according to the following reaction scheme (represented in an idealized form for the case of a urethane group):

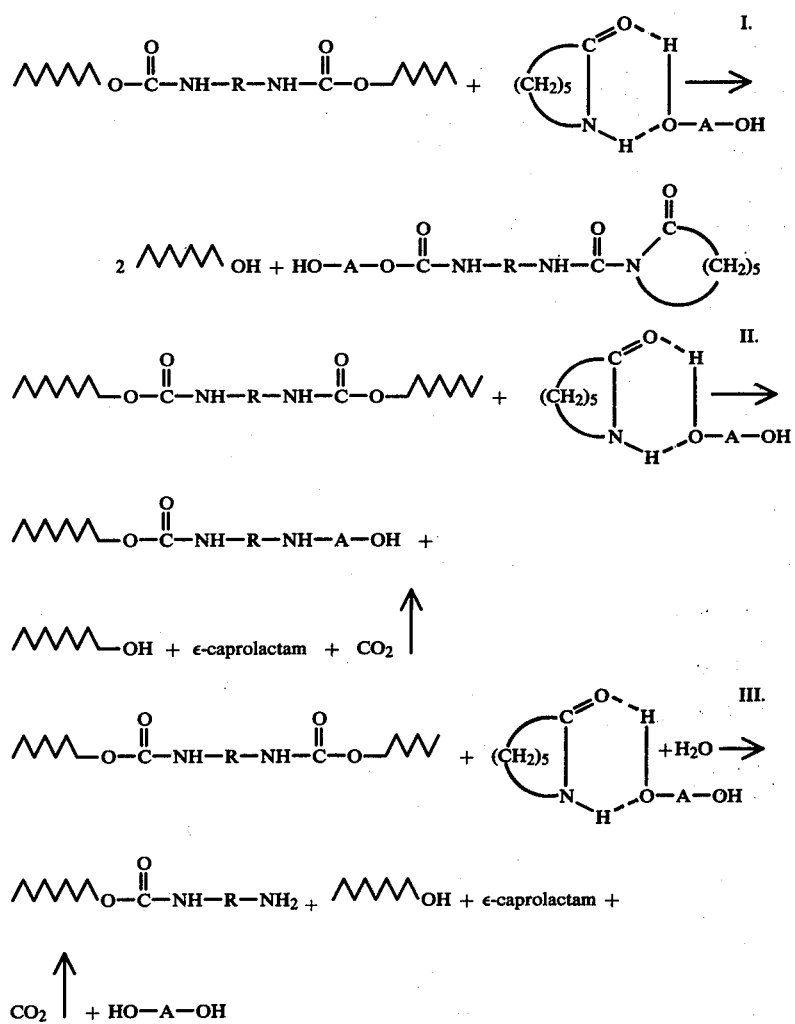

In the above, R represents a divalent organic group obtainable by removal of the isocyanate groups from a diisocyanate; A analogously represents the divalent organic group of a diol.

Analytical data shows that the polyol mixtures obtained as degradation products according to the present invention generally contain at least from about 0.5 to 1%, by weight, of primary amino groups (more in the case of degradation of polyureas). Since both the lactam and the catalysts used for preparing the dissociated polyurethane resins are left in the dissociation product, the polyhydroxyl compounds obtained are so powerfully activated towards isocyanates that when, for example, they are used again for the production of flexible or rigid foams, it may be possible to dispense with the addition of the conventional catalysts. The catalysts used for such purposes are generally very expensive fine chemicals. The degradation products obtained are therefore also very economical as polyol components for the production of polyurethane resins for this reason.

The lactam still contained in the polyol mixtures also increases the reactivity of any water added towards isocyanates, thereby considerably accelerating the blowing reaction for foaming.

With suitable choice of reaction conditions, such as elevated temperatures (the reaction mixture is maintained at from about 200° to 250° C., preferably from about 210° to 220° C. for from about 5 minutes to 1 hour) and/or the addition of known basic catalysts, part of the lactam used may be polymerized to polyamides during and/or after the dissociation reaction, these polyamides being finely dispersed in the polyol mixtures formed. Such polyamide dispersions may be used for the production of foams having increased elasticity and they are particularly suitable for producing highly flexible polyurethane elastomers. When organic-inorganic resins, such as those described in German Offenlegungsschrift No. 2,325,090, dissociated, finely divided dispersions of silica in isocyanate-reactive compounds are obtained as reaction products, which may also be used for the production of polyurethane resins.

Compounds corresponding to the following general formulae may be used as lactams according to the present invention:

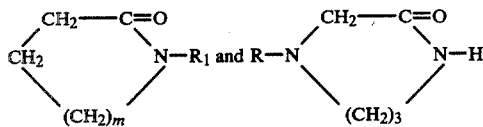

wherein m represents an integer of from 0 to 9;

R represents an araliphatic group, preferably containing from 7 to 10 carbon atoms, and an aliphatic group preferably containing from 1 to 10 carbon atoms, or a pyridine group, optionally substituted by lower alkyl groups; and $R_1$ represents hydrogen or a methyl group, and preferably hydrogen.

Particularly suitable examples include lactams of ω-amino carboxylic acids, such as 3-amino propionic acid, 4-amino butyric acid, 5-amino valeric acid, 6-amino caproic acid or 10-amino capric acid; N-substituted azalactams, such as 1-N-methyl-hexahydro-1,4-diazepinone-(3); 1-N-butyl-hexahydro-1,4-diazepinone-(3); 1-N-α-pyridyl-hexahydro-1,4-diazepinone-(3), and the like. Butyrolactam, valerolactam, 1-N-methyl-hexahydro-1,4-diazepinone-(3) and, particularly, ε-caprolactam are preferred.

The lactam associates to be used may be prepared as described in British Pat. No. 1,391,891 and U.S. Pat. No. 3,867,373 by simply mixing the lactams or azalactams with the adduct-formers at temperatures of from 0° to 100° C., preferably from 30° to 70° C. The quantity of adduct-formers (b) and (c) added is preferably from 1 to 20 equivalents, and most preferably from 3 to 12 equivalents, per mol of lactam or azalactam.

The mixtures of lactams and water and/or low molecular weight adduct-formers which are in a state of association equilibrium are thinly viscous liquids which may easily be mixed with the conventional commercial higher molecular weight hydroxyl-polyethers and/or hydroxyl polyesters to prepare the dissociation reagents to be used. As mentioned above, however, all the components may be mixed together at once at tempertures of from 0° to 100° C., preferably from 30° to 70° C. The dissociation reagents to be used are liquids which surprisingly have substantially lower viscosities than the corresponding mixtures of low molecular weight and high molecular weight adduct-formers which contain no lactam. The polyurethane waste is therefore thoroughly wetted during the dissociation reactions, so that even the dissociation of polyurethanes which are highly branched or in the form of coarse particles is accelerated.

Suitable low molecular weight adduct-formers, apart from water, are compounds which contain at least two Zerewitinoff-active hydrogen atoms and have a molecular weight of from 62 to 200, preferably from 62 to 150, for example those mentioned in British Pat. No. 1,391,891; U.S. Pat. Nos. 3,867,373, 4,013,625, and 3,758,444; and German Offenlegungsschrift No. 2,129,198. The following low molecular weight Zerewitinoff-active components are preferred: ethylene glycol, diethylene glycol, thiodiglycol, the isomeric propane diols, di- and tri-propylene glycol, glycerol, trimethylol propane, hexane-1,6-diol and isomers of hexane diol, hexahydroquinone, 1,4-bis-hydroxymethyl cyclohexane, methylene glycol and bis-hemiacetals of formaldehyde of the above-mentioned polyhydroxyl compounds. Ethylene glycol, propylene glycol-(1,2), diethylene glycol and dipropylene glycol and mixtures of these compounds are particularly preferred. Among the dialcohols which contain aminogroups, diethanolamine, N-methyl-diethanolamine and triethanolamine are preferred. Water may also be used as the Zerewitinoff-active component, but in that case it is generally necessary to carry out the dissociation reaction at elevated pressure.

Higher molecular weight adduct-formers suitable for the process include polyhydroxyl compounds having a molecular weight of from 300 to 6000, preferably from 400 to 4000, and most preferably from 400 to 3000, e.g. polyesters, polyethers, polythioethers, polyacetals, polycarbonates and polyester amides having at least two, generally from 2 to 8, preferably from 2 to 4, hydroxyl groups, such as the polyhydroxyl compounds known for the production of both homogeneous and cellular polyurethanes. Polyether polyols are preferred.

The hydroxyl polyesters used may be, for example, reaction products of polyhydric, preferably dihydric, alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of low alcohols or mixtures thereof may be used for preparing the polyesters. The polycarboxylic acids may be aliphatic, cycloaliphatic, aromatic and/or heterocyclic and they may be substituted, e.g. by halogen atoms, and/or they may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexa- hydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexane dimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as $\epsilon$-caprolactone, or hydroxycarboxylic acids, such as $\omega$-hydroxycaproic acid, may also be used.

The polyethers which have at least two, generally from 2 to 8, preferably 2 or 3 hydroxyl groups are also known. They are prepared, for example, by polumerization of epoxides, such as ethylene oxide, propylene oxide, butylene oxide, tetrahydrofuran, styrene oxide or epichlorohydrin, either each on its own, e.g. in the presence of $BF_3$, or by addition of these epoxides, optionally as mixtures or successively, to starting components having reactive hydrogen atoms, such as water ammonia, alcohols or amines, e.g. ethylene glycol, propylene glycol-(1,3) or -(1,2), trimethylolpropane, 4,4'-dihydroxy-diphenylpropane, aniline, ethanolamine or ethylene diamine. Sucrose polyethers may also be used according to the present invention, e.g. those described in German Auslegeschriften Nos. 1,176,358 and 1,064,938. It is in many cases preferred to use polyethers which contain predominantly primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Pat. No. 1,152,536) are also suitable, as well as polybutadienes which have OH groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from glycols, such as diethylene glycol, triethylene glycol, 4,4'-dioxethoxydiphenyl dimethylmethane and hexanediol, by reaction with formaldehyde. Suitable polyacetals for the purposes of the present invention may also be prepared by the polymerization of cyclic acetals.

The polycarbonates containing hydroxyl groups used may be of the known type, for example those which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or with phosgene.

Suitable polyester amides and polyamides include, for example, the predominantly linear condensates prepared from polybasic saturated and unsaturated carboxylic acids or anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenolformaldehyde resins or of alkylene oxides and urea-formaldehyde resins are also suitable for the purposes of the present invention.

Representatives of these compounds which may be used are known and have been described for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich 1966, e.g. on pages 45–71.

Mixtures of the above-mentioned compounds which contain at least two active hydrogen atoms and have a molecular weight of from 300 to 6000 may, of course, also be used, for example mixtures of polyethers and polyesters.

Polyhydroxyl compounds in which high molecular weight polyadducts or polycondensates are finely dispersed or dissolved may also be used. Such modified polyhydroxyl compounds are obtained when polyaddition reactions (e.g. reactions between polyisocyanates and amino functional compounds) or polycondensation reactions (e.g. between formaldehyde and phenols and/or amines) are carried out in situ in the above-mentioned high molecular weight hydroxyl compounds. Processes of this type have been described in German Auslegeschriften Nos. 1,168,075, 1,260,142, 2,513,815, 2,550,833 and 2,550,862; U.S. application Ser. Nos. 464,099, 664,324, 740,451, 740,452, 740,450, 740,454 and U.S. Pat. No. 4,042,537. These modified polyhydroxyl compounds may also be obtained as described in U.S. Pat. No. 3,869,413 or German Offenlegungsschrift No. 2,550,860 by mixing a previously prepared polymer dispersion with a polyhydroxyl compound and then removing the water from the mixture.

The lactam associate mixture is generally used in the process in a quantity of from about 35 to 1000 parts, and preferably from 100 to 400 parts per 100 parts of polyurethane. The quantity of lactam itself is from about 4 to 50 parts, preferably from 10 to 40 parts, most preferably from 15 to 30 parts, based on 100 parts of the polyurethane material.

The mixtures of lactam and adduct-formers used which are in a state of association equilibrium, are also excellent solvents for many metal salts, metal oxides and hydroxides, amines and/or organo-tin compounds.

It is therefore possible, but not necessary, to use catalysts for accelerating the process. As mentioned above, the presence of strongly basic catalysts during the dissociation reaction of the polyurethane brings about a partial polymerization of the lactam put into the process.

The following are preferred catalysts: the alcoholates, phenolates, hydroxides and carbonates of Na, K, Li, Zn, Mg and Al, the salts of these metals with organic acids, such as formic acid, acetic acid, propionic acid, butyric acid or stearic acid; the K- and Na-salt of isononylphenol and p-nitrophenol; sodium and potassium carbonate, sodium and potassium salts of mercapto compounds and complexes of ethyl acetate, acetyl acetone, etc., for example with Al, Bi, Zn, Cu or Mn.

Any of the tertiary amines used as catalysts for isocyanate reactions may be used because they also catalyze the dissociation reaction according to the present invention. The following are preferred among the tertiary amines: triethylamine, tributylamine, N-methyl-morpholine, N-ethyl-morpholine, N-cocomorpholine, N,N,N',N'-tetramethylethylene diamine, 1,4-diazabicyclo-(2,2,2)-octane, N-methyl-N'-dimethyl-aminoethyl-piperazine, bis-[2-(N,N-dimethylamino)-ethyl]-ether, N,N-dimethyl benzylamine, bis-N,N-diethylaminoethyl)-adipate, N,N-diethyl benzylamine, pentamethyl diethylene triamine, N,N-diethyl-cyclohexylamine, N,N,N',N'-tetramethyl-1,3-butane diamine, N,N-dimethyl-$\beta$-phenylethylamine, 1,2-dimethyl imidazole, 2-methyl imidazole, and silaamines having carbon-silicon bonds, such as the compounds described in German Pat. No. 1,229,290, for example 2,2,4-trimethyl-2-silamorpholine or 1,3-diethylaminomethyl-tetramethyldisiloxane.

Tertiary amines having active hydrogen atoms are also suitable catalysts, e.g. triethanolamine, N-ethyl-diethanolamine, dimethyl ethanolamine and reaction products thereof with propylene oxide and/or ethylene oxide.

Tertiary amines having at least two active hydrogen atoms may also be used as Zerewitinoff-active components of the lactam addition compounds, as mentioned above. In that case, dissociation proceeds very rapidly, even in the case of rigid foams and polyisocyanurate foams.

Instead of amines, other nitrogen-containing bases, such as tetraalkyl ammonium hydroxides or hexahydro triazines, may be used as catalysts.

The reactions may also be catalyzed by organo-tin compounds, e.g. by stannoacylates, such as tin-II-octoate, tin-II-ethylhexoate, tin-II-valerate, tin-II-acetate and tin-II-laurate, or dialkyl tin salts of carboxylic acids, e.g. dibutyl tin acetate, dibutyl tin dilaurate, dibutyl tin maleate or dioctyl tin diacetate.

Other suitable catalysts include zinc chloride, calcium chloride, magnesium chloride, tin-II-chloride and lithium iodide. The catalysts may be used in quantities of from about 0.0005 to 10%, by weight, preferably from 0.01 to 4%, by weight, (based on the polyurethane).

In the process, the polyurethane waste or reject goods is cut up, torn up or milled to increase the surface area of the particles and thereby accelerate the dissociation reaction. Introduction of these particles into the lactam associate mixture which has been preheated to the given reaction temperature is then carried out preferably in such a way that no fresh particles are added until the previously added particles have dissolved in the lactam associate. At the beginning of the reaction, and if small reaction batches are used, the polyurethane particles may be introduced into a cold or only moderately heated lactam associate mixture and heated with this mixture to the reaction temperature. At the temperatures indicated, the dissociation reactions are in many cases completed within a few seconds, even without the use of catalysts, and, in less favorable cases, within minutes.

At a temperature of from 180° to 200° C., flexible foam flakes, for example, dissolve within about 5 seconds in the lactam associate mixtures, foaming and liberating carbon dioxide. To dissolve highly cross-linked rigid polyurethane foams or polyurethane foams which also contain isocyanurate and carbodiimide groups also requires only a few seconds, in the most unfavorable cases from 1 to 2 minutes.

As may be seen from the reaction scheme of the decomposition reactions presented above, some of the reaction steps are accompanied by the liberation of carbon dioxide. The dissociation of polyurethane resin waste is therefore in most cases accompanied by vigorous foaming. It may therefore be advisable in individual cases to add the polyurethane resin waste continuously over a considerable period of time even though dissociation itself would take much less time.

As indicated by I.R. spectroscopy and viscosity measurements and the determination of the quantity of gas released, polyurethane bonds continue to be split in the lactam associate mixture even after the polyurethane waste has completely dissolved. To lower the viscosity of the disassociated products obtained according to the present invention, the said products may be stirred at from 200° to 220° C. until no further decrease in viscosity is observed and no more carbon dioxide is liberated. This state at which the reaction is complete, is generally reached, at the latest, from about 1 to 3 hours after all the polyurethane waste has been added.

As mentioned above, the quantity of polyurethane introduced may vary within wide limits. For example, up to about 3 parts, by weight, of polyurethane resin may be introduced into 1 part, by weight, of lactam associate mixture. However, if large quantities of polyurethane are introduced into the reaction mixture, the viscosity rises so that the extent to which the polyurethane particles become wetted diminishes and the reaction is somewhat slower than indicated above. This effect, however, is not significant until relatively large quantities of polyurethane have been introduced and it may easily be compensated by using suitable stirrer and kneader apparatus.

A total of from about 0.25 to 1 part, by weight, of polyurethane is preferably mixed with 1 part, by weight, of lactam asociate mixture. The viscosity of the products of the process is then from about 2000 to 50,000 cP at 20° C. and is to a large extent determined by the viscosity of the high molecular weight polyol used and the starting components which had been used for the disassociated polyurethane resin.

The proportion of low molecular weight adduct-formers in the association equilibrium to the high molecular weight polyol may also be varied within wide limits, but is preferably from 1 to 10 for obtaining high quantity rigid polyurethane foams.

In principle, the procedure described above could be reversed, i.e. the total quantity of polyurethane could be mixed with the lactam associate, or the lactam associate could be added to the polyurethane. Such a procedure, however, is not suitable for all foams (on account of the large volume thereof).

It is possible by the instant process to convert a polyurethane resin waste or reject goods into isocyanate-reactive compounds in simple stirrer apparatus without the use of pressure. Due to the simplicity of the process, the manufacturer or processor of polyurethane resins is provided with the opportunity to convert waste directly into re-usable products, thereby reducing the cost of storage, transport and disposal. In addition, environmental pollution by polyurethane resin waste stored in depots is considerably reduced.

Another particular advantage of the process is that it may be carried out continuously by virtue of the very rapid dissociation reaction. According to a preferred embodiment of the process, the polyurethane waste and lactam adducts are introduced together or at separate points into a screw extruder which is preferably equipped with a degasification device situated before the feed point, viewed in the direction of flow, in order to remove the air introduced with the polyurethane. This has the advantage of preventing any side reactions due to atmospheric oxygen during the dissociation reaction. Mechanical devices such as those described in U.S. Pat. No. 4,051,212, which is incorporated herein by reference, are advantageously used, particularly if pressure is to be employed (e.g. when lactam-water adducts are used). In this preferred embodiment of the process, it is easily assessed by a simple preliminary test how the residence time of the reaction mixture and the temperature in the extruder must be adjudsted to each other to ensure complete dissociation of the polyurethane introduced.

The following Examples are provided to explain the process in more detail and to illustrate the use of the polyols prepared. The figures given represent parts, by weight, or percentage, by weight, unless otherwise indicated.

EXAMPLES

EXAMPLE 1

(a) Preparation of the starting material

The polyurethane foam waste used in this Example was obtained from a rigid polyurethane foam having closed cells which had been prepared as follows:

90 parts, by weight, of a polyether of OH No. 450 synthesized from propylene oxide and a mixture of saccharose, 1,2-propylene glycol and water as starter;

10 parts, by weight, of a hydroxyl group-containing fireproofing agent based on diethyl phosphite, formaldehyde and diethanolamine according to German Pat. No. 1,143,022;

1 part by weight, of water;

1 part, by weight, of a commercial polyether siloxane block copolymer according to German Auslegeschriften Nos. 1,905,101 and 2,029,293 (stabilizer "OS 710" of Bayer AG);

1 part, by weight, of triethanolamine; and 20 parts, by weight, of monofluorotrichloromethane; were vigorously mixed. 145 parts, by weight, of a commercial diphenylmethane diisocyanate having an isocyanate content of 31% were added and the components were thoroughly mixed using a high-speed stirrer. After a starting time of about 10 to 20 seconds, a rigid, yellow to brown polyurethane foam having a closed cell structure and a gross density of 38 kg/m$^3$ was obtained.

After a curing time of 2 weeks, this rigid polyurethane foam was ground up into small particles (particle size from about 0.5 to 1 mm).

(b) Process According to the Present Invention 126 parts, by weight, of ε-caprolactam;

299 parts, by weight, of 1,2-propylene glycol;

566 parts, by weight, of a polyether having a hydroxyl functionality of 3 and a hydroxyl number of 380 synthesized from propylene oxide with a mixture of saccharose, 1,2-propylene glycol, and water as starter; and 9 parts, by weight, of potassium acetate; are heated to a temperature of from 50° to 60° C. with vigorous stirring and maintained at this temperature for 15 minutes with continuous stirring. A clear, homogeneous liquid is formed. The associate mixture obtained in this way is heated to a temperature of from 195° to 200° C. 500 g of the rigid polyurethane foam described above are then introduced portion-wise over a period of about 30 minutes with stirring at such a rate that the temperature does not drop below 190° C. The polyurethane foam introduced into the mixture dissolves spontaneously and foams with liberation of carbon dioxide. Stirring is continued for about 3 hours after all the foam particles have been added. A clear, homogeneous liquid hving a viscosity of 3175 cP at 20° C. and an OH No. of 516 is obtained.

The time taken for adding the foam particles depends on the means available and may be considerably shortened by using suitable apparatus since the foam particles dissolve spontaneously within a very short time.

It is not necessary to observe the length of time indicated for stirring after addition of the foam particles, but if shorter after-stirring times are employed, the viscosity of the product will be higher.

If stirring after addition of the foam particles is continued for only 15 minutes at 200° C. instead of for the length of time indicated, a homogeneous, clear liquid is again obtained, but its viscosity at 20° C. is 15,800 cP.

(c) Preparation of a Polyurethane Foam 10 parts, by weight, of trichloroethyl phosphate;

1.5 parts, by weight, of the siloxane/hydroxy alkylene copolymer of Example 1 (a);

2.0 parts, by weight, of a 25% solution of potassium acetate in diethylene glycol; and 25 parts, by weight, of trichlorofluoromethane; are added to 50 parts, by weight, of the dissociation product obtained; and the components are vigorously mixed.

This mixture is then vigorously mixed for 10 seconds with 100 parts, by weight, of a commercial diphenyl methane diisocyanate having an isocyanate content of 31%, using a high-speed stirrer. After a starting time of from 15 to 20 seconds, a yellow rigid polyurethane foam having closed cells is obtained. This foam has a gross density of 27 kg/m$^3$ and is dimensionally stable even at $-30°$ C.

EXAMPLE 2

1000 parts, by weight, of an associate mixture of:

126 parts, by weight, of ε-caprolactam;

299 parts, by weight, of 1,2-propylene glycol; and 566 parts, by weight, of a polyether having a hydroxyl functionality of 3 and hydroxyl number of 380 synthesized from propylene oxide and a mixture of saccharose, 1,2-propylene glycol and water as starter; are heated together with 9 parts, by weight, of potassium acetate as described in Example 1, and 1000 parts, by weight, of the rigid polyurethane foam from Example 1 (a) are added portion-wise. The mixture is then stirred for another 3 hours at from 210 to 220° C.

A viscous, homogeneous liquid having a viscosity of $\eta_{20°}$ C. = 47,800 cP and an OH No. of 461 is obtained.

This polyhydroxyl compound is used to prepare a rigid polyurethane foam by the same method as indicated in Example 1 (c), except that instead of the 50 parts, by weight, of dissociation product prepared according to Example 1 (b), 50 parts, by weight, of the dissociation product described above are used.

A yellow to brownish rigid polyurethane foam is again obtained. It has a gross density of 28 kg/m$^3$.

COMPARISON EXAMPLE

This Example illustrates the relatively poor results obtained if the rigid polyurethane foam is first dissociated according to U.S. application Ser. No. 723,872 with a mixture of ε-caprolactam and low molecular weight polyol in a state of association equilibrium and the product is only then mixed with a polyether of the type used in the previous Examples.

A mixture is first prepared from 148 parts, by weight, of ε-caprolactam, 352 parts of (1,2)-propylene glycol and 10 parts, by weight, of potassium acetate and heated to 200° C. 1165 parts, by weight, of rigid polyurethane foam waste are introduced into the mixture at this temperature within a period of 5 ½ hours in the same way as in Example 1 (a). The mixture is stirred for 2 hours at 220° C. after all the polyurethane waste has been added.

A tough, viscous mass having a viscosity of $\eta_{20°}$ C. =600,000 cP is obtained. 665 g of the polyether from Examples 1 (a) and 2 having a hydroxyl number of 380 and a hydroxyl functionality of 3 are stirred into this mass over a period of 8 hours.

A viscous liquid having a viscosity of $\eta_{20°}$ C. = 65,047 cP and an OH No. of 469 is obtained.

Although a rigid polyurethane foam may be prepared from this polyol mixture by laboratory experiments carried out in accordance with the instructions given in the previous Examples, machine-foaming by the methods customarily used in the art is not possible without some difficulty owing to the high viscosity of the mixture.

EXAMPLE 3

426 g of the foam waste from Example 1 (a) are introduced into 1000 g of an associate mixture by a method analogous to that of Example 1 (b). This mixture had been prepared in the same way as in Example 1 (b), except that the high molecular weight polyether used in Example 1 (b) was replaced by the same quantity of a polyether of hydroxyl functionality 5.8 and OH No. 380 which had been synthesized from propylene oxide and a mixture of saccharose, trimethylol propane and water as starter.

A homogeneous liquid having a viscosity of $\eta_{20°}$ C. = 11,708 cP and an OH No. of 517 (acid no. 2.3) is obtained. This liquid is also suitable for the production of high quality rigid polyurethane foams.

EXAMPLE 4

426 g of foam waste from Example 1 (a) are introduced in a manner analogous to Example 1 (b) into 1000 g of an associate mixture which had been prepared in the same way as in Example 1 (b), except that the high molecular weight polyether used there was replaced by the same quantity of a basic polyether of OH No. 490 synthesized from propylene oxide and ethylene diamine.

A homogeneous, liquid polyol mixture which is highly activated towards isocyanates on account of its high tertiary amine content is obtained. It has a viscosity of $\eta_{20°}$ C. = 7141 cP and an OH No. of 597. The liquid is very suitable, both as single polyol component and as mixture with other polyols (to improve the reactivity thereof) for the production of rigid polyurethane foams.

EXAMPLE 5

An associate mixture used for breaking up 488 parts, by weight, of rigid polyurethane foam is prepared as described in Example 1 (b) from 111 parts, by weight, of 2-pyrrolidone (γ-butyrolactam), 352 parts, by weight, of 1,2-propylene glycol, 655 parts, by weight, of the polyether from Example 1 (b) and 10 parts, by weight, of potassium acetate.

A homogeneous liquid having a viscosity of $\eta_{20°}$ C. = 2301 cP and an OH No. of 514 is obtained after 2 hours stirring (following completed addition of foam). This liquid is also very suitable for the production of rigid polyurethane foam.

EXAMPLE 6

An associate mixture used for breaking up 488 parts, by weight, of rigid polyurethane foam is prepared as described in Example 1 (b) from 130 parts, by weight, of 1-methyl-2-pyrrolidone, 352 parts, by weight, of 1,2-propylene glycol, 665 parts, by weight, of the polyether polyol from Example 1 (b) and 10 parts, by weight, of potassium acetate.

After 2 hours stirring (following completed addition of the foam), a homogeneous liquid having a viscosity of $\eta_{20°}$ C. = 3283 cP and an OH No. of 509 is obtained. This liquid is also very suitable as polyol component for the production of rigid polyurethane foams.

EXAMPLE 7

This Example illustrates that the process may be used not only for breaking up the chain-lengthening types of isocyanate bonds and the chain-branching types of bonds which according to German Offenlegungsschrift No. 2,238,667 are unstable bonds, but also the isocyanurate group and carbodiamide group, which are basically very stable. The rigid polyester polyurethane foam used in this Example was prepared in such a way that it contained approximately 5% of isocyanurate groups and 6% of carbodiimide groups. The following method was employed:

25 parts of a polyester of OH No. 300 synthesized from HET acid and ethylene glycol;

12 parts of trichloroethyl phosphate;

1.5 parts of the polyether siloxane from Example 1 (a);

1 part of glycerol; and 1.5 parts of a 25% solution of potassium acetate in diethylene glycol; were vigorously mixed with 20 parts of trichlorofluoromethane.

To this mixture are added 100 parts of an isocyanate prepolymer having an isocyanate content of 26% prepared from commercial diphenyl methane diisocyanate having an isocyanate content of 31% and a sucrose-polyether polyol of OH No. 210 and the components were vigorously mixed using a highspeed stirrer. A rigid, closed-celled polyurethane foam (isocyanate index 200) containing approximately 5% of isocyanurate bonds and having a unit weight of 35 kg/m³ is obtained. After 2 weeks curing, the foam is milled into smaller particles.

284 parts of this rigid polyurethane foam waste are introduced, at 200° C., by the method described in Example 1 (b), into an associate mixture of 125 parts of E-caprolactam, 305 parts, of 1,2-propylene glycol and 560 parts of the polyether polyol from Example 1 (b), as well as 17 parts of potassium acetate.

Stirring is continued for 2 hours after all the foam has been added, and the temperature is slowly raised from 210 to 220° C. during this time.

A liquid having a viscosity of $\eta_{20°}$ C. = 1844 cP and and OH No. of 544 is obtained in this way.

10 parts, by weight, of trichloroethyl phosphate, 1.5 parts, by weight, of the polyether siloxane from Example 1 (a), 2.0 parts, by weight, of a 25% solution of potassium acetate in diethylene glycol and 25 parts, by weight, of trichloro-fluoromethane are added to 50 parts, by weight, of the resulting polyol in a manner analogous to Example 1 (c) and the components are vigorously mixed.

To this mixture are added 100 parts, by weight, of a commercial diphenyl methane diisocyanate having an isocyanate content of 31% and the components are vigorously mixed using a high-speed stirrer for 10 seconds. After a starting time of about 15 seconds, a yellow to brownish rigid polyurethane foam having a closed cell structure and a gross density of 28 kg/m² is obtained.

EXAMPLE 8

This Example shows that waste flexible polyurethane foam may also be dissociated by the process according to the present invention and the regenerates obtained may be used again for the production of rigid polyurethane foams.

The foam waste used in this Example was obtained from a flexible, open-celled polyether-polyurethane foam which has been prepared as follows:

100 parts, by weight, of a polyether of OH No. 48 synthesized from propylene oxide and ethylene oxide with 1,2-propylene glycol and trimethylol propane as starters;

4 parts, by weight, of water;

1.2 parts, by weight, of the polyether siloxane from Example 1 (a)

0.2 parts, by weight, of triethylene diamine; and 0.25 parts, by weight, of the tin(II) salt of 2-ethyl caproic acid; are vigorously mixed together. To this mixture are added:

50 parts, by weight, to tolylene diisocyanate (80% 2,4- and 20% 2,6-isomer) and the components are vigorously mixed using a high-speed stirrer. The foaming reaction sets in after a starting time of approximately 10 seconds and a white, flexible, elastic polyurethane foam is obtained. It is open-celled and has a unit weight of 38 kg/m³ and theoretically is cross-linked with an excess of 0.02 NCO-equivalents (index 102). The foam is heated for 2 hours at 100° C. and then size reduced to flakes.

500 parts, by weight, of these foam flakes are introduced portion-wise over a period of 60 minutes into a stirrer vessel equipped with reflux condenser and internal thermometer. This vessel has previously been charged with 1000 parts, by weight, of an associate mixture of 126 parts, by weight, of ε-caprolactam, 299 parts, by weight, of propylene glycol, 566 parts, by weight, of the polypropylene oxide from Example 1 (b) and 9 parts, by weight, of potassium acetate and heated to a temperature of from 195 to 200° C. The foam flakes instantly dissolve in the associate accompanied by slight foaming. Stirring is continued for 2 hours at 215° C. after all the foam flakes have been added.

A homogeneous liquid having a viscosity of $\eta_{20°}$ C. = 2383 cP and an OH No. of 408 is obtained. A rigid polyurethane foam of excellent quality, having a gross density of 28 kg/m³, may be produced from this liquid by the process indicated in Example 1 (c).

EXAMPLE 9

500 g of the foam waste from Example 1 (a) are introduced into 1168 g of an associate mixture by a method analogous to that of Example 1 (b). This mixture had been prepared from (1) 500 g of a polypropylene oxide having an OH-functionality of 3 and an OH-number of 380, started on a mixture of sucrose, water and 1,2-propylene glycol, (2) 394 g of polypropylene oxide having an OH-functionality of 5,3 and an OH-number of 470 started on a mixture of sucrose, water and 1,2-propylene glycol, (3) 116 g of 1,2-propylene glycol, (4) 148 g of ε-caprolactam and (5) 10 g of potassium acetate.

A homogenous liquid having a viscosity of $\eta_{20°}$ C. = 11,140cP and an OH-number of 440 (acid number 2.1) is obtained. This liquid is also suitable for the production of high quality rigid polyurethane foams.

What is claimed is:

1. In a process for dissociating cellular and noncellular polyurethane resins into re-usuable starting products for the isocyanate polyaddition process, wherein the polyurethane is reacted with associates of lactams and adductformers having at least two Zerewitinoff-active hydrogen atoms at from 150 to 250° C., optionally at elevated pressure, the improvement wherein from 35 to 1000 parts, by weight, based on 100 parts, by weight, of the polyurethane, of an associated mixture of:
   (a) from 4 to 50 parts, by weight, of a lactam or azalactam, based on 100 parts, by weight, of polyurethane; and a mixture of:
   (b) water and/or compound having a molecular weight of from 62 to 200 having at least two Zerewitinoff-active hydrogen atoms; and
   (c) a polyhydroxyl compound having a molecular weight of from 300 to 6000; is used, and the proportion by weight of components (b) to (c) is from 1:10 to 10:1, and wherein said component (a) is used in a quantity such that said 35 to 1000 parts comprises from 4 to 50 parts of component (a).

2. The process according to claim 1 characterized in that the quantity of components (b)+(c) is from 1 to 20 equivalents per mol of component (a).

3. The process according to claim 1 characterized in that the quantity of components (b)+(c) is from 3 to 12 equivalents per mol of component (a).

4. The process according to claim 1, characterized in that said lactam corresponds to the following general formula

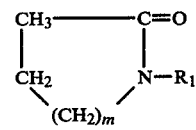

wherein
m represents an integer from 0 to 9 and
R₁ represents hydrogen or a methyl group.

5. The process of claim 1 wherein said lactam is selected from the following formula:

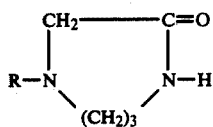

wherein R represents hydrogen or a group containing from 1 to 10 carbon atoms, which group may be an aliphatic or araliphatic group or a pyridine group optionally substituted by lower alkyl groups.

6. The process according to claim 1, characterized in that said compounds having a molecular weight of from 62 to 200 having at least two Zerewitinoff-active hydrogen atoms are ethylene glycol, propane diol-(1,2), propane diol(1,3), dipropylene glycol, diethylene glycol, triethylene glycol, triproplyene glycol, diethanolamine, triethanolamine or N-methyl-diethanolamine.

7. The process according to claim 1, characterized in that said polyhydroxyl compounds are polyethers having a molecular weight of from 400 to 4000 and contain from 2 to 8 hydroxyl groups.

8. The process according to claim 1, characterized in that the dissociation reaction is accelerated by the addition of from 0.0005 to 10%, by weight, catalysts, based on the polyurethane.

9. The process according to claim 1, characterized in that the reaction mixture is exposed for from 5 to 60 minutes to a temperature of from 200 to 250° C. and/or to the action of basic catalysts in order to effect partial polymerization of the lactam put into the process into polyamides.

10. The process according to claim 1, characterized in that the dissociation of the polyurethane is carried out continuously in a screw extruder.

11. The process of claim 1, wherein said lactam or azalactam is used in amounts of 15 to 30 parts, by weight, based on 100 parts, by weight, of polyurethane.

12. In the process for the production of polyurethane resins, the improvement wherein the polyol component is obtained by reacting cellular and/or non-cellular polyurethane resins with a mixture of:
 (a) from 4 to 50 parts, by weight, of a lactam or azalactam, based on 100 parts, by weight, of polyurethane; and a mixture of:
 (b) water and/or a compound having a molecular weight of from 62 to 200 having at least two Zerewitinoff-active hydrogen atoms; and
 (c) a polyhydroxyl compound having a molecular weight of from 300 to 6000; is used, and the proportion by weight of components (b) to (c) is from 1:10 to 10:1, and wherein said component (a) is used in a quantity such that said 35 to 1000 parts comprises from 4 to 50 parts of component (a).

* * * * *